United States Patent
Konowalczyk

(10) Patent No.: US 12,492,826 B2
(45) Date of Patent: Dec. 9, 2025

(54) METHODS AND SYSTEMS FOR PREDICTIVELY PREPARING WATER PROVISION SYSTEM

(71) Applicant: OCTOPUS ENERGY HEATING LIMITED, London (GB)

(72) Inventor: Peter Konowalczyk, London (GB)

(73) Assignee: OCTOPUS ENERGY HEATING LIMITED, London (GB)

( * ) Notice: Subject to any disclaimer, the term of this patent is extended or adjusted under 35 U.S.C. 154(b) by 186 days.

(21) Appl. No.: 18/264,512

(22) PCT Filed: Feb. 7, 2022

(86) PCT No.: PCT/IB2022/051077
§ 371 (c)(1),
(2) Date: Aug. 7, 2023

(87) PCT Pub. No.: WO2022/168045
PCT Pub. Date: Aug. 11, 2022

(65) Prior Publication Data
US 2024/0044521 A1 Feb. 8, 2024

(30) Foreign Application Priority Data

Feb. 7, 2021 (GB) ..................... 2101678
Jul. 2, 2021 (GB) ..................... 2109593
(Continued)

(51) Int. Cl.
F24D 19/10 (2006.01)
F24D 17/02 (2006.01)
F24H 15/152 (2022.01)

(52) U.S. Cl.
CPC ......... *F24D 19/1054* (2013.01); *F24D 17/02* (2013.01); *F24H 15/152* (2022.01); *F24D 2200/12* (2013.01)

(58) Field of Classification Search
CPC .... F24H 15/277; F24H 15/421; F24H 15/164; F24H 15/176; F24H 15/172;
(Continued)

(56) References Cited

U.S. PATENT DOCUMENTS

| 4,798,059 A | 1/1989 | Morita |
| 8,412,381 B2 | 4/2013 | Nikovski et al. |

(Continued)

FOREIGN PATENT DOCUMENTS

| AT | 504285 A1 | 4/2008 |
| CN | 201191144 Y | 2/2009 |

(Continued)

OTHER PUBLICATIONS

Chinese Office Action dated Apr. 23, 2024 from corresponding Chinese Patent Application No. 202280013611.2, 8 pages.
(Continued)

*Primary Examiner* — Frantz F Jules
*Assistant Examiner* — Martha Tadesse
(74) *Attorney, Agent, or Firm* — Ruggiero McAllister & McMahon LLC

(57) ABSTRACT

A computer-implemented method predictively prepares a water provision system installed in a building. The water provision system includes a heat pump configured to transfer thermal energy from the surrounding to a thermal energy storage medium and a control module configured to control operation of the heat pump. The water provision system is configured to provide water heated by the thermal energy storage medium to an occupant of the building at one or more water outlets. The method is performed by the control module and includes: receiving a current location of the occupant, estimating an expected arrival time for the occupant to arrive at the building based on the current location,
(Continued)

and determining an expected occupancy of the building based on the expected arrival time.

16 Claims, 9 Drawing Sheets

(30) Foreign Application Priority Data

| | | | |
|---|---|---|---|
| Jul. 2, 2021 | (GB) | ...................................... | 2109594 |
| Jul. 2, 2021 | (GB) | ...................................... | 2109596 |
| Jul. 2, 2021 | (GB) | ...................................... | 2109597 |
| Jul. 2, 2021 | (GB) | ...................................... | 2109598 |
| Jul. 2, 2021 | (GB) | ...................................... | 2109599 |
| Jul. 2, 2021 | (GB) | ...................................... | 2109600 |
| Aug. 2, 2021 | (GB) | ...................................... | 2111081 |

(58) Field of Classification Search
CPC .... F24H 15/174; F24H 15/152; F24H 15/223; F24D 19/1054; F24D 17/02
See application file for complete search history.

(56) References Cited

U.S. PATENT DOCUMENTS

| | | | |
|---|---|---|---|
| 2011/0271953 A1 | 11/2011 | Wortmann et al. | |
| 2013/0073094 A1* | 3/2013 | Knapton | ................ G05B 13/02 700/278 |
| 2015/0323943 A1 | 11/2015 | Chan | |
| 2016/0010878 A1 | 1/2016 | Lee et al. | |
| 2018/0038616 A1 | 2/2018 | Scheers et al. | |
| 2019/0243396 A1 | 8/2019 | Sobieski et al. | |
| 2021/0318027 A1 | 10/2021 | Boros et al. | |

FOREIGN PATENT DOCUMENTS

| | | | |
|---|---|---|---|
| CN | 201265954 Y | 7/2009 | |
| CN | 102252363 A | 11/2011 | |
| CN | 203758014 U | 8/2014 | |
| CN | 104977867 A | 10/2015 | |
| CN | 105698339 A | 6/2016 | |
| CN | 106462171 A | 2/2017 | |
| CN | 107355841 A | 11/2017 | |
| CN | 111043762 A | 4/2020 | |
| CN | 111189348 A | 5/2020 | |
| CN | 111197787 A | 5/2020 | |
| CN | 111750528 A | 10/2020 | |
| CN | 111811142 A | 10/2020 | |
| DE | 29921889 U1 | 6/2000 | |
| DE | 10006564 A1 | 8/2000 | |
| DE | 10151253 C1 | 11/2002 | |
| DE | 10 2008 043 030 A1 | 4/2010 | |
| DE | 2014 225 693 A1 | 6/2016 | |
| EP | 0 007 538 A1 | 2/1980 | |
| EP | 1 684 035 A1 | 7/2006 | |
| EP | 3098536 A1 * | 11/2016 | ......... F24D 19/1048 |
| EP | 3 336 446 A2 | 6/2018 | |
| GB | 2 605 660 B | 4/2023 | |
| JP | 57-95534 A | 6/1982 | |
| JP | 58-12992 A | 1/1983 | |
| JP | 1-256792 A | 10/1989 | |
| JP | 11-44495 H | 2/1999 | |
| JP | 2004156847 A * | 6/2004 | ............. F25B 13/00 |
| JP | 3788419 B2 | 6/2006 | |
| JP | 2011-220655 A | 11/2011 | |
| JP | 2012-2469 A | 1/2012 | |
| JP | 2014-122749 A | 7/2014 | |
| JP | 2015-529986 A | 10/2015 | |
| KR | 2010-0030141 A | 3/2010 | |
| WO | 2011/121299 A1 | 10/2011 | |
| WO | 2020-209979 A2 | 10/2020 | |

OTHER PUBLICATIONS

Japanese Office Action (Reasons for Refusal) dated Mar. 5, 2024 from corresponding Japanese Patent Application No. 2023547365, 8 pages.
Korean Notice of Submission of Opinion dated Feb. 2, 2024 from corresponding South Korean Patent Application No. 10-2023-7027912, 12 pages.
International Search Report dated May 31, 2022 from corresponding International Patent Application No. PCT/IB2022/051077, 4 pages.
Written Opinion dated May 31, 2022 from corresponding International Patent Application No. PCT/IB2022/051077, 6 pages.
Great Britain Search Report dated Aug. 10, 2021 from corresponding GB Application No. 2109596.3, 1 page.
Great Britain Search Report dated Aug. 10, 2021 from corresponding GB Application No. 2109597.1, 1 page.
Great Britain Search Report dated Aug. 10, 2021 from corresponding GB Application No. 2109598.9, 1 page.
Great Britain Search Report dated Aug. 10, 2021 from corresponding GB Application No. 2109599.7, 1 page.
Great Britain Search Report dated Aug. 12, 2021 from corresponding GB Application No. 2109594.8, 1 page.
Great Britain Search Report dated Aug. 20, 2021 from corresponding GB Application No. 2109600.3, 1 page.
Great Britain Search Report dated Aug. 20, 2021 from corresponding GB Application No. 2109593.0, 1 page.
Great Britain Search Report dated Sep. 24, 2021 from corresponding GB Application No. 2111081.2 1 page.
Great Britain Search Report dated Jan. 16, 2023 from corresponding GB Application No. 2215387.8, 1 page.
Great Britain Search Report dated Feb. 20, 2023 from corresponding GB Application No. 2300970.7, 2 pages.
Great Britain Search Report dated Feb. 14, 2023 from corresponding GB Application No. 2109599.7, 2 pages.
Great Britain Search Report dated Apr. 25, 2023 from corresponding GB Application No. 2304349.0, 1 page.
Korean Search Report dated Feb. 2, 2024 from corresponding Korean Patent Application No. 10-2023-7027912, 12 pages.

* cited by examiner

METHODS AND SYSTEMS FOR PREDICTIVELY PREPARING WATER PROVISION SYSTEM

CROSS-REFERENCE TO RELATED APPLICATIONS

The present application is a 35 U.S.C. § 371 National Stage patent application of International patent application PCT/IB2022/051077, filed on Feb. 7, 2022, which claims priority to Great Britain patent applications GB 2101678.7 filed on Feb. 7, 2021, GB 2109593.0 filed on Jul. 2, 2021, GB 2109594.8 filed on Jul. 2, 2021, GB 2109596.3 filed on Jul. 2, 2021, GB 2109597.1 filed on Jul. 2, 2021, GB 2109598.9 filed on Jul. 2, 2021, GB 2109599.7 filed on Jul. 2, 2021, GB 2109600.3 filed on Jul. 2, 2021, and GB 2111081.2 filed on Aug. 2, 2021, the entire contents of each of which is incorporated by reference herein.

BACKGROUND OF THE DISCLOSURE

1. Field of the Disclosure

The present disclosure relates generally to utility management. In particular, the present disclosure relates to methods and systems that can be used to help modify hot water usage habit of a user.

2. Description of Related Art

Whether it is in a commercial or domestic setting, heated water is required throughout the day all year round. It goes without saying that the provision of heated water requires both clean water and a source of heat. To provide heated water, a heating system is provided to an often centralised water provision system to heat water up to a predetermined temperature e.g. set by a user, and the heat source used is conventionally one or more electric heating elements or burning of natural gas. Generally, during periods of high energy (e.g. gas or electricity) demand utilities providers would implement a peak tariff which increases the unit cost of energy, partly to cover the additional cost of having to purchase more energy to supply to customers and partly to discourage unnecessary energy usage. Then, during periods of low energy demand utilities providers would implement an off-peak tariff which lowers the unit cost of energy to incentivise customers to switch to using energy during these off-peak periods instead of peak periods to achieve an overall more balanced energy consumption over time. However, such strategies are only effective if customers are always aware of the changes in tariffs and in addition make a conscious effort to modify their energy consumption habits.

Clean water as utility is currently receiving much attention. As clean water becoming scarcer, there has been much effort to educate the public on the conservation of clean water as well as development of systems and devices that reduce water consumption, such as aerated showers and taps to reduce water flow, showers and taps equipped with motion sensors that stop the flow of water when no motion is detected, etc. However, these systems and devices are restricted to a single specific use and only have limited impact on problematic water consumption habits.

With growing concerns over the environmental impact of energy consumption, there has been a recent growing interest in the use of heat pump technologies as a way of providing domestic heated water. A heat pump is a device that transfers thermal energy from a source of heat to a thermal reservoir. Although a heat pump requires electricity to accomplish the work of transferring thermal energy from the heat source to the thermal reservoir, it is generally more efficient than electrical resistance heaters (electrical heating elements) as it typically has a coefficient of performance of at least 3 or 4. This means under equal electricity usage up to 3 or 4 times the amount of heat can be provided to users via heat pumps compared to electrical resistance heaters.

The heat transfer medium that carries the thermal energy is known as a refrigerant. Thermal energy from the air (e.g., outside air, or air from a hot room in the house) or a ground source (e.g., ground loop or water filled borehole) is transferred to a contained refrigerant, for example by means of a heat exchanger. The now higher energy refrigerant is compressed, causing it to rise in temperature considerably, and this now hot refrigerant subsequently exchanges thermal energy via a heat exchanger to a heating water loop. In the context of heated water provision, heat extracted by the heat pump can be transferred to a water in an insulated tank that acts as a thermal energy storage, and the heated water may be used at a later time when needed. The heated water may be diverted to one or more water outlets, e.g. a tap, a shower, a radiator, as required. However, a heat pump generally requires more time compared to electrical resistance heaters to get water up to the desired temperature, in part because heat pumps are typically slow to start up.

Since different households, workplaces and commercial spaces have different requirements and preferences for heated water usage, new ways of heated water provision are desirable in order to enable heat pumps to be a practical alternative to electrical heaters. Moreover, in order to conserve energy and water, it may be desirable to modulate the consumption of energy and clean water; however, modulating utility consumption cannot simply be a blanket cap on usage.

It is therefore desirable to provide improved methods and systems for the provision of heated water.

SUMMARY OF THE DISCLOSURE

An aspect of the present technology provides a computer-implemented method of predictively preparing a water provision system installed in a building, the water provision system comprising a heat pump configured to transfer thermal energy from the surrounding to a thermal energy storage medium and a control module configured to control operation of the heat pump, the water provision system being configured to provide water heated by the thermal energy storage medium to an occupant of the building at one or more water outlets, the method being performed by the control module and comprising: receiving a current location of the occupant; estimating an expected arrival time for the occupant to arrive at the building based on the current location; determining an expected occupancy of the building based on the expected arrival time; and activating the heat pump to begin storing thermal energy in the thermal energy storage medium for a predetermined length of time before the expected arrival time to store thermal energy in the thermal energy storage medium.

According to present embodiments, the control module is able to estimate when an occupant is expected to arrive at the building based on a current location of the occupant, for example a GPS signal received from the occupant's smartphone. This information can be used in a number of different ways for example to prepare the building for when it is occupied, e.g. warming the building up in cold weather, cooling the building down in hot weather, and storing heat in a thermal energy storage medium in advance (pre-charging) such that the stored thermal energy can be extracted for use at a later time. Compared to conventional approaches for preparing a water heating system in advance (e.g. to provide hot water for central heating) based on a pre-set schedule (which cannot account for daily, weekly or one-off variations) or manual remote activation by an occupant (which may not be practical e.g. if the occupant is driving), determining or estimating an arrival time based on the current location of one or more occupants provides a more accurate indication of an expected occupancy of a building, which in turn enables the water provision system to be operated in a more energy efficient manner, for example by pre-charging the thermal energy storage medium to enable a heat pump to be more effectively used as a way of heating water or the building but without unnecessarily operating the water heating system (e.g. for central heating) when it is not needed. By pre-charging the thermal energy storage medium before an expected rise in occupancy, it reduces delays in using a heat pump as a way of heating water that normally arise as a consequence of the need for the thermal energy storage medium to get up to an operating temperature, thus enabling the heat pump to be used as an effective way of heating water.

In some embodiments, the method may be at least partially performed by a first machine learning algorithm, MLA, executing on the control module, the first MLA having been trained to predict an occupancy of the building based on a current location of the occupant.

In some embodiments, receiving a current location of the occupant may comprise communicating with an electronic device previously registered on the control module, the electronic device comprises one or more of a smartphone, a tablet computer, and/or a satellite navigation system.

In these embodiments, the occupant may register one or more electronic devices on the control module as part of an initial setup process. For example, the registration process may enable the control module to recognize the one or more electronic devices when the one or more electronic devices attempts to communicate with the control module wirelessly over a communication channel, e.g. to transmit a current location, current traffic conditions and/or an expected arrival time, amongst other information.

In some embodiments, estimating an expected arrival time may comprise obtaining the expected arrival time from the electronic device.

In some embodiments, the expected arrival time may be estimated based on current traffic condition at the current location.

In some embodiments, the predetermined length of time may be set based on the expected occupancy, wherein the predetermined length of time is set to be longer for higher expected occupancy. More heated water may be required for higher occupancy, for example for heating and general use (e.g. hand wash, shower), and to accommodate a higher demand for heated water, the thermal energy storage medium can be pre-charged to a higher operating temperature by running the heat pump for a longer period of time before the occupants are expected to arrive at the building.

In some embodiments, the predetermined length of time may be set based on an expected heated water usage estimated using a utility usage pattern established by a second MLA for the water provision system based on sensor data obtained from the water provision system. There may be instances when low occupancy does not mean low demand for heated water, for example when an occupant frequently takes a shower upon arriving at the building or uses hot water to prepare a meal before other occupants arrive. By pre-charging the thermal energy storage medium for a length of time based on an expected heated water usage, it is possible to ensure a sufficient supply of heated water by means of a heat pump and reduces the use of e.g. electrical heating elements.

In some embodiments, the utility usage pattern may comprise an expected cold water usage in respect of time, day and/or date, an expected heated water usage in respect of time, day and/or date, an expected energy usage in respect of time, day and/or date, or a combination thereof.

In some embodiments, the method may further comprise diverting a portion of the thermal energy extracted by the heat pump to heat the building from a current indoor temperature to a first indoor temperature, wherein the predetermined length of time is set based on the current indoor temperature and the first indoor temperature. Some of the thermal energy extracted by the heat pump can be used to warm the building in cold weather, either directly or through circulating heated water in a central heating system. The amount of thermal energy needed to warm the building up to a pre-set first indoor temperature will depend on the current indoor temperature. Thus, by pre-charging the thermal energy storage medium for a length of time based on the current indoor temperature and the pre-set first temperature, it is possible to ensure that the building reaches the first temperature upon arrival of the occupant(s) while storing sufficient amount of energy in the thermal energy storage medium to provide heated water.

In some embodiments, the predetermined length of time may be manually set by the occupant.

It may be desirable, in some embodiments, for the thermal energy storage medium to be pre-charged to an optimal operating temperature prior to the arrival of the occupant(s). Thus, in some embodiments, the predetermined length of time may be set based on a time for the thermal energy storage medium to reach an optimal operating temperature.

In some embodiments, the time for the thermal energy storage medium to reach an optimal operating temperature may be estimated based on an average of a plurality of previous times for the thermal energy storage medium to reach an optimal operating temperature.

While an average time for pre-charging the thermal energy storage medium over a number of previous occasions is a good indicator for the length of time needed when conditions are similar, there may be occasions when e.g. there is a sudden change in weather conditions when the average time becomes a less accurate indicator. Thus, in some embodiments, the time for the thermal energy storage medium to reach an optimal operating temperature may be determined by a third MLA trained to determine the time for the thermal energy storage medium to reach an optimal operating temperature based on sensor data obtained from the water provision system.

In some embodiments, the sensor data may comprise an indoor temperature, an outdoor temperature, a time the heat pump was last activated, or a combination thereof.

Another aspect of the present technology provides a computer-readable medium comprising machine-readable code, which, when executed by a processor, causes the processor to perform the method as described above.

A further aspect of the present technology provides a control module configured to control a water provision system, the control module comprising a processor having a machine learning algorithm executing thereon trained to perform the method as described above.

In some embodiments, the control module may further comprise a communication interface configured to communicate with an electronic device registered on the control module over a communication channel, wherein the electronic device comprises one or more of a smartphone, a tablet computer, and/or a satellite navigation system.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments of the present disclosure will now be described with reference to the accompanying drawings, in which.

DETAILED DESCRIPTION OF THE DISCLOSURE

Figure 1:
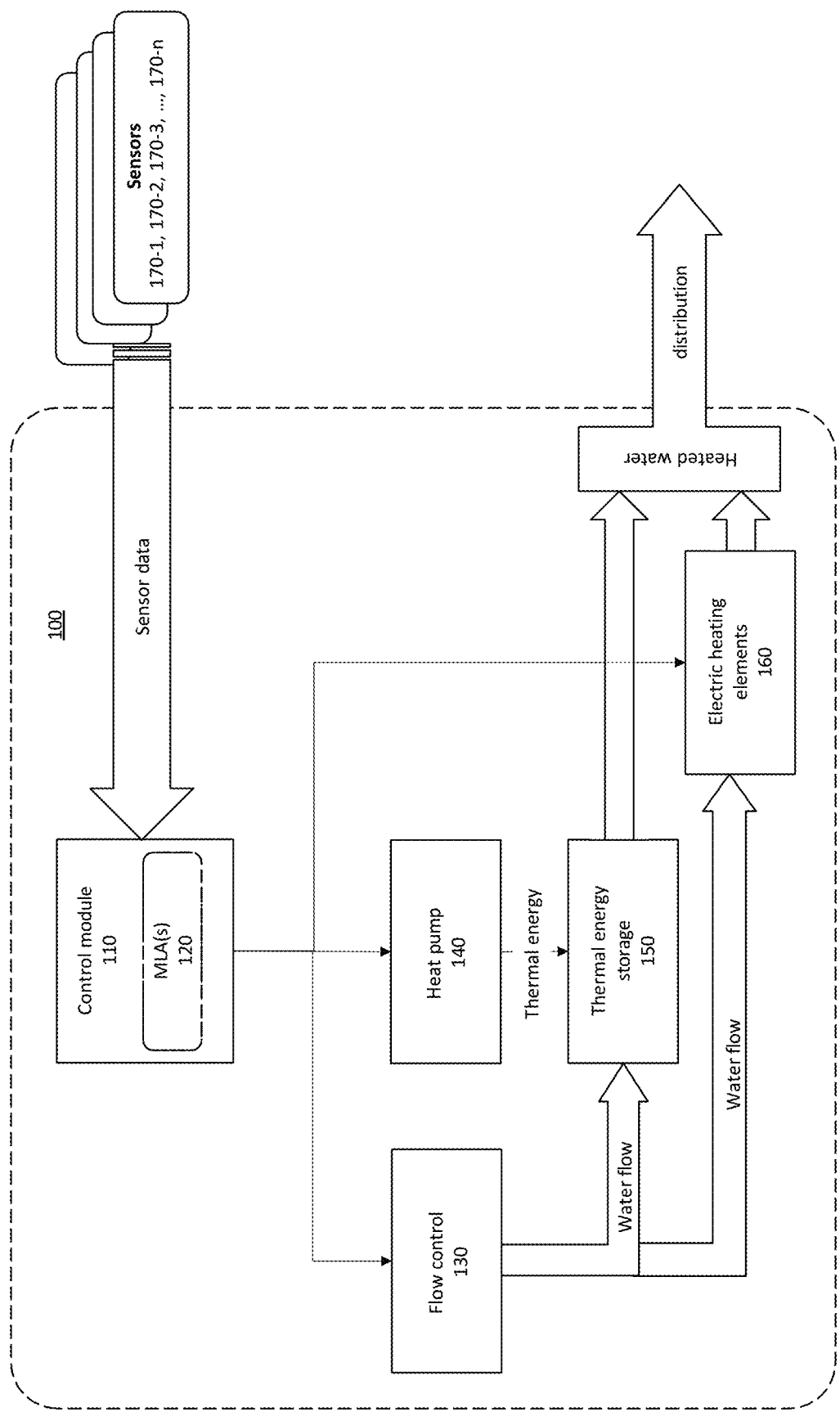
FIG. 1 is a schematic system overview of an exemplary water provision system.

In view of the foregoing, the present disclosure provides various approaches for the provision of heated water using or assisted by a heat pump, and in some cases for modulating the use of utilities including water and energy to reduce water and energy wastage. The present approaches may be implemented through the use of one or more machine learning algorithm (MLA) trained to control and modulate water provision for a water provision system via a control module based on sensor data received from the water provision system. For example, during a training phase, the MLA may monitor heated water usage of a household in a domestic setting and establish a normal usage pattern. The MLA may be trained to recognise different types of water usage (e.g. shower, hand wash, heating, etc.) based on a number of different input such as the time of the day, the day of the week, the date, the weather, etc. In some embodiments, the MLA may collect additional data, for example, on the time when a water outlet of the system is turned on and off, the duration of use, the water temperature set by the user and the actual water temperature when heated water is provided to the user. In use, the MLA may use the learned usage pattern in a variety of different ways to improve the efficiency and effectiveness of heated water provision using or assisted by a heat pump.

In some embodiments, the MLA may be trained to implement one or more energy-saving strategies when or before a water outlet is turned on, and optionally to implement one or more interactive strategies to help modify water and energy usage habits e.g. to gradually reduce water and/or energy usage.

The following gives a brief overview of a number of different types of machine learning algorithms for embodiments in which one or more MLAs are used. However, it should be noted that the use of an MLA to establish a normal usage pattern is only one way of implementing the present techniques but it is not essential; in some embodiments, a control module may be programmed with appropriate software functions to target specific heated water usage, e.g. excessive water flow, and to respond in a predetermined manner.

Overview of MLAs

There are many different types of MLAs known in the art. Broadly speaking, there are three types of MLAs: supervised learning-based MLAs, unsupervised learning-based MLAs, and reinforcement learning based MLAs.

Supervised learning MLA process is based on a target-outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data. Examples of supervised learning-based MLAs include: Regression, Decision Tree, Random Forest, Logistic Regression, etc.

Unsupervised learning MLA does not involve predicting a target or outcome variable per se. Such MLAs are used for clustering a population of values into different groups, which is widely used for segmenting customers into different groups for specific intervention. Examples of unsupervised learning MLAs include: Apriori algorithm, K-means.

Reinforcement learning MLA is trained to make specific decisions. During training, the MLA is exposed to a training environment where it trains itself continually using trial and error. The MLA learns from past experience and attempts to capture the best possible knowledge to make accurate decisions. An example of reinforcement learning MLA is a Markov Decision Process.

It should be understood that different types of MLAs having different structures or topologies may be used for various tasks. One particular type of MLAs includes artificial neural networks (ANN), also known as neural networks (NN).

Neural Networks (NN)

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than attempting to determine a complex statistical arrangements or mathematical algorithms for a given situation, the given NN aims to provide an "intuitive" answer based on a "feeling" for a situation. The given NN is thus regarded as a trained "black box", which can be used to determine a reasonable answer to a given set of inputs in a situation when what happens in the "box" is unimportant.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation and the like.

Deep Neural Networks

In some non-limiting embodiments of the present technology, the NN can be implemented as a deep neural network. It should be understood that NNs can be classified into various classes of NNs and one of these classes comprises recurrent neural networks (RNNs).

Recurrent Neural Networks (RNNs)

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs), and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Residual Neural Network (ResNet)

Another example of the NN that can be used to implement non-limiting embodiments of the present technology is a residual neural network (ResNet).

Deep networks naturally integrate low/mid/high-level features and classifiers in an end-to-end multilayer fashion, and the "levels" of features can be enriched by the number of stacked layers (depth).

To summarize, the implementation of at least a portion of the one or more MLAs in the context of the present technology can be broadly categorized into two phases—a training phase and an in-use phase. First, the given MLA is trained in the training phase using one or more appropriate training data sets. Then, once the given MLA learned what data to expect as inputs and what data to provide as outputs, the given MLA is run using in-use data in the in-use phase.

Water Provision System

In embodiments of the present techniques, cold and heated water is provided by a centralized water provision system to a plurality of water outlets, including taps, showers, radiators, etc., for a building in a domestic or commercial setting. An exemplary water provision system according to an embodiment is shown in FIG. 1. In the present embodiment, the water provision system 100 comprises a control module 110. The control module 110 is communicatively coupled to, and configured to control, various elements of the water provision system, including flow control 130 for example in the form of one or more valves arranged to control the flow of water internal and external to the system, a (ground source or air source) heat pump 140 configured to extract heat from the surrounding and deposit the extracted heat in a thermal energy storage 150 to be used to heat water, and one or more electric heating elements 160 configured to directly heat cold water to a desired temperature by controlling the amount of energy supplied to the electric heating elements 160. Heated water, whether heated by the thermal energy storage 150 or heated by the electric heating elements 160, is then directed to one or more water outlets as and when needed. In the embodiments, the heat pump 140 extracts heat from the environment (e.g. ambient air for an air-source heat pump, geothermal energy for a ground-source heat pump, or from a body of water for a water-source heat pump), which heat is absorbed by a refrigerant and then transferred from the refrigerant to a working liquid which in turn transfers heat to a thermal energy storage medium within the thermal energy storage 150 where it is preferably stored as latent heat. Energy from the thermal energy storage medium can then be used to heat cooler water, e.g. cold water from a water supply, possibly a mains water supply, to a desired temperature. The heated water may then be supplied to various water outlets in the system.

In the present embodiment, the control module 110 is configured to receive input from a plurality of sensors 170-1, 170-2, 170-3, . . . , 170-n. The plurality of sensors 170-1, 170-2, 170-3, . . . , 170-n may for example include one or more air temperature sensors disposed indoor and/or outdoor, one or more water temperature sensors, one or more water pressure sensors, one or more timers, one or more motion sensors, and may include other sensors not directly linked to the water provision system 100 such as a GPS signal receiver, calendar, weather forecasting app on e.g. a smartphone carried by an occupant and in communication with the control module via a communication channel. The control module 110 is configured, in the present embodiment, to use the received input to perform a variety of control functions, for example controlling the flow of water through the flow control 130 to the thermal energy storage 150 or electric heating elements 160 to heat water. In the present embodiment, a machine learning algorithm (MLA) 120 is used, which may execute on a processor (not shown) of the control module 110 or execute on a server which communicates with the processor of the control module 110 over a communication channel. The MLA 120 may be trained using the input sensor data received by the control module 110 to establish a baseline water and energy usage pattern based e.g. on the time of the day, the day of the week, the date (e.g. seasonal changes, public holiday), occupancy, etc. The learned usage pattern may then be used to determine, and in some cases improve, the various control functions performed by the control module 110.

While a heat pump is generally more energy efficient for heating water compared to an electrical resistance heater, it takes time (often a minute or more) to start up a heat pump and time is also required for a sufficient amount of thermal energy to be transferred into a thermal energy storage medium for the storage medium to reach the desired operation temperature before it can be used to heat water; thus, from an initial starting point a heat pump will typically take longer to heat the same amount of water to the same temperature compared to an electrical resistance heater. Moreover, in some embodiments, the heat pump 140 may for example use a phase change material (PCM), which changes from a solid to a liquid upon heating, as a thermal energy storage medium. In this case, additional time may be required to turn the PCM from solid to liquid, if it has been allowed to solidify, before thermal energy extracted by the heat pump has the effect of raising the temperature of the thermal storage medium (up until then the energy is stored as latent heat). Although this approach to heating water is slower, it consumes less energy to heat water compared to electric heating elements, so overall, energy is conserved and the cost for providing heated water is reduced.

Phase Change Materials

In the present embodiments, a phase change material may be used as a thermal storage medium for the heat pump. One suitable class of phase change materials are paraffin waxes which have a solid-liquid phase change at temperatures of interest for domestic hot water supplies and for use in combination with heat pumps. Of particular interest are paraffin waxes that melt at temperatures in the range 40 to 60 degrees Celsius (° C.), and within this range waxes can be found that melt at different temperatures to suit specific applications. Typical latent heat capacity is between about 180 kJ/kg and 230 kJ/kg and a specific heat capacity of perhaps 2.27 $Jg^{-1}K^{-1}$ in the liquid phase, and 2.1 $Jg^{-1}K^{-1}$ in the solid phase. It can be seen that very considerable amounts of energy can be stored taking using the latent heat of fusion. More energy can also be stored by heating the phase change liquid above its melting point. For example, when electricity costs are relatively low during off-peak periods, the heat pump may be operated to "charge" the thermal energy storage to a higher-than-normal temperature to "overheat" the thermal energy storage.

A suitable choice of wax may be one with a melting point at around 48° C., such as n-tricosane $C_{23}$, or paraffin $C_{20}$-$C_{33}$, which requires the heat pump to operate at a temperature of around 51° C., and is capable of heating water to a satisfactory temperature of around 45° C. for general domestic hot water, sufficient for e.g. kitchen taps, shower/bathroom taps. Cold water may be added to a flow to reduce water temperature if desired. Consideration is given to the temperature performance of the heat pump. Generally, the maximum difference between the input and output temperature of the fluid heated by the heat pump is preferably kept in the range of 5° C. to 7° C., although it can be as high as 10° C.

While paraffin waxes are a preferred material for use as the thermal energy storage medium, other suitable materials may also be used. For example, salt hydrates are also suitable for latent heat energy storage systems such as the present ones. Salt hydrates in this context are mixtures of inorganic salts and water, with the phase change involving the loss of all or much of their water. At the phase transition, the hydrate crystals are divided into anhydrous (or less aqueous) salt and water. Advantages of salt hydrates are that they have much higher thermal conductivities than paraffin waxes (between 2 to 5 times higher), and a much smaller volume change with phase transition. A suitable salt hydrate for the current application is $Na_2S_2O_3 \cdot 5H_2O$, which has a melting point around 48° C. to 49° C., and latent heat of 200-220 kJ/kg.

Usage Pattern

Figure 2:
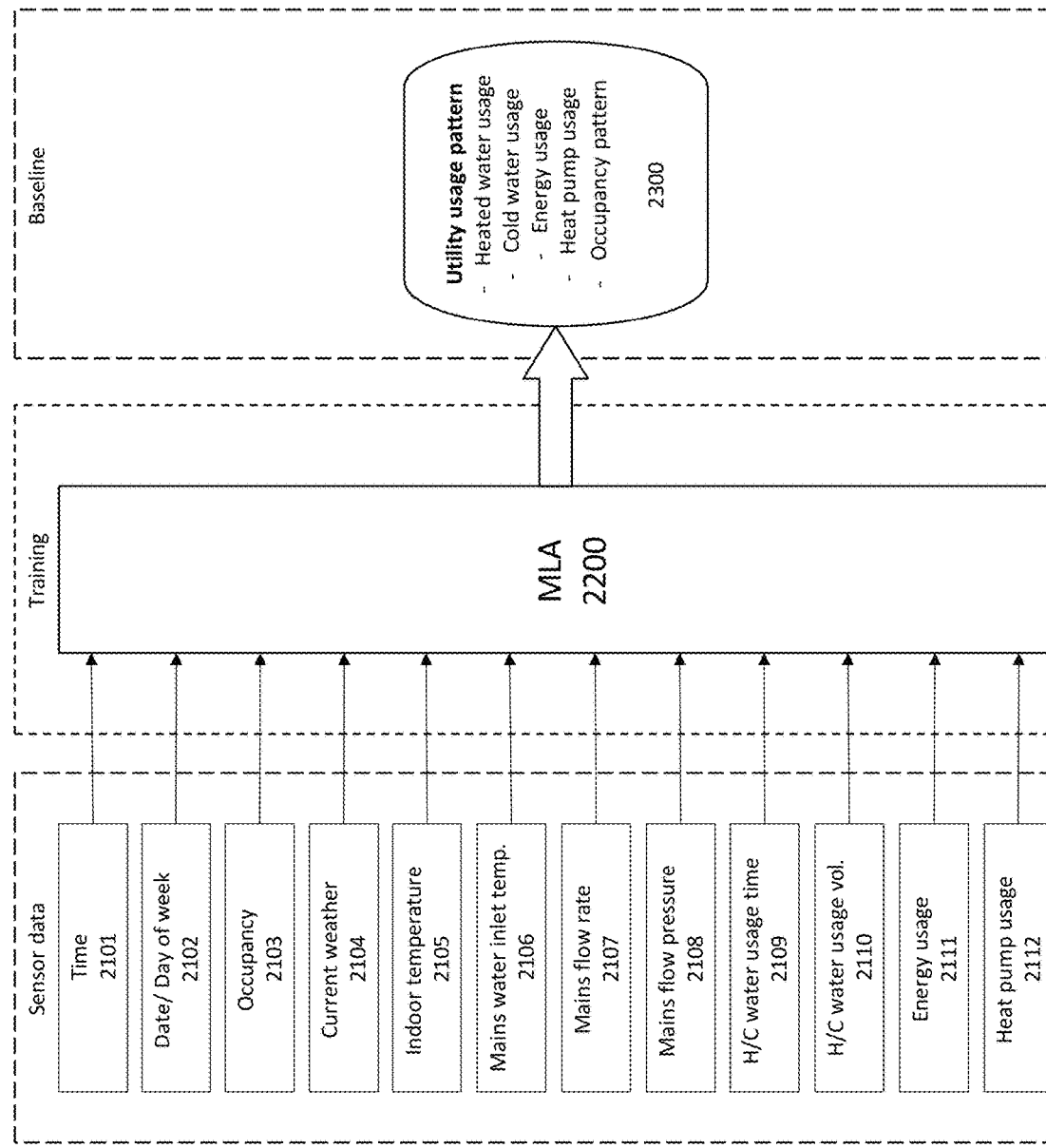
FIG. 2 schematically shows an exemplary training phase of an MLA to establish a usage pattern.

FIG. 2 illustrates a training phase of an MLA 2200, such as the MLA 120, to establish a baseline utility usage pattern according to an embodiment.

In the embodiment, the MLA 2200 receives inputs from a plurality of sensors and other sources over a period of time to learn the usage pattern e.g. of the occupant(s) of a house. For example, a control module, e.g. control module 110, on which the MLA 2200 executes may comprise a clock and the MLA 2200 may receive a time of the day 2101 and a date and day of the week 2102 from the clock. The house may have a plurality of motion sensors installed and the MLA 2200 may receive occupancy data 2103 from the motion sensors. In another embodiment described below, occupancy may also be predicted based on a plurality of factors. The control module may be in communication with one or more outdoor temperature sensors for the MLA 2200 to receive an input of the current weather 2104. The control module may also be in communication with one or more indoor temperature sensors for the MLA 2200 to receive an indoor temperature 2105. A plurality of water temperature, pressure and flow sensors may be disposed at various locations of the water provision system, e.g. at the mains water inlet to measure the mains water inlet temperature 2106, mains flow rate 2107 and mains flow pressure 2108, which can be input to the MLA 2200. A sensor may be disposed at one or more or each water outlet (or a valve controlling water flow to the water outlet) to detect when the respective water outlet is turned on and when it is turned off, and the temperature of the water at the water outlet, and data relating to hot/cold water usage time and temperature 2109 and hot/cold water usage volume 2110 can be input to the MLA 2200. The MLA 2200 may also collect data on energy usage 2111 by the water provision system, for example time of use, amount of energy used, and, in cases where the control module is in communication with the energy provider, current tariff. The MLA 2200 may also collect data on heat pump usage 2112 such as time of use, length of use, etc. It should be noted that it is not essential for the MLA to receive, collect and/or use all the input sensor data described herein, and that the list of input sensor data described herein is not exhaustive, other input data may also be received, collected and/or used by the MLA as desired. In particular, in embodiments where the control module is in communication with e.g. one or more smart devices (e.g. a smartphone) or personal computers of one or more occupants, the MLA may receive and use other personal or public data obtained from these devices.

During the training phase, the MLA 2200 establishes a water and energy usage pattern for the occupants based on the received input data. For example, the usage pattern 2300 may include a pattern of heated water usage, a pattern of cold-water usage, a pattern of energy usage, a pattern of heat pump usage, an occupancy pattern that provide a baseline of expected usage based on e.g. the time of the day, the day of the week, the date, occupancy level, etc.

Occupancy Prediction

Figure 3:
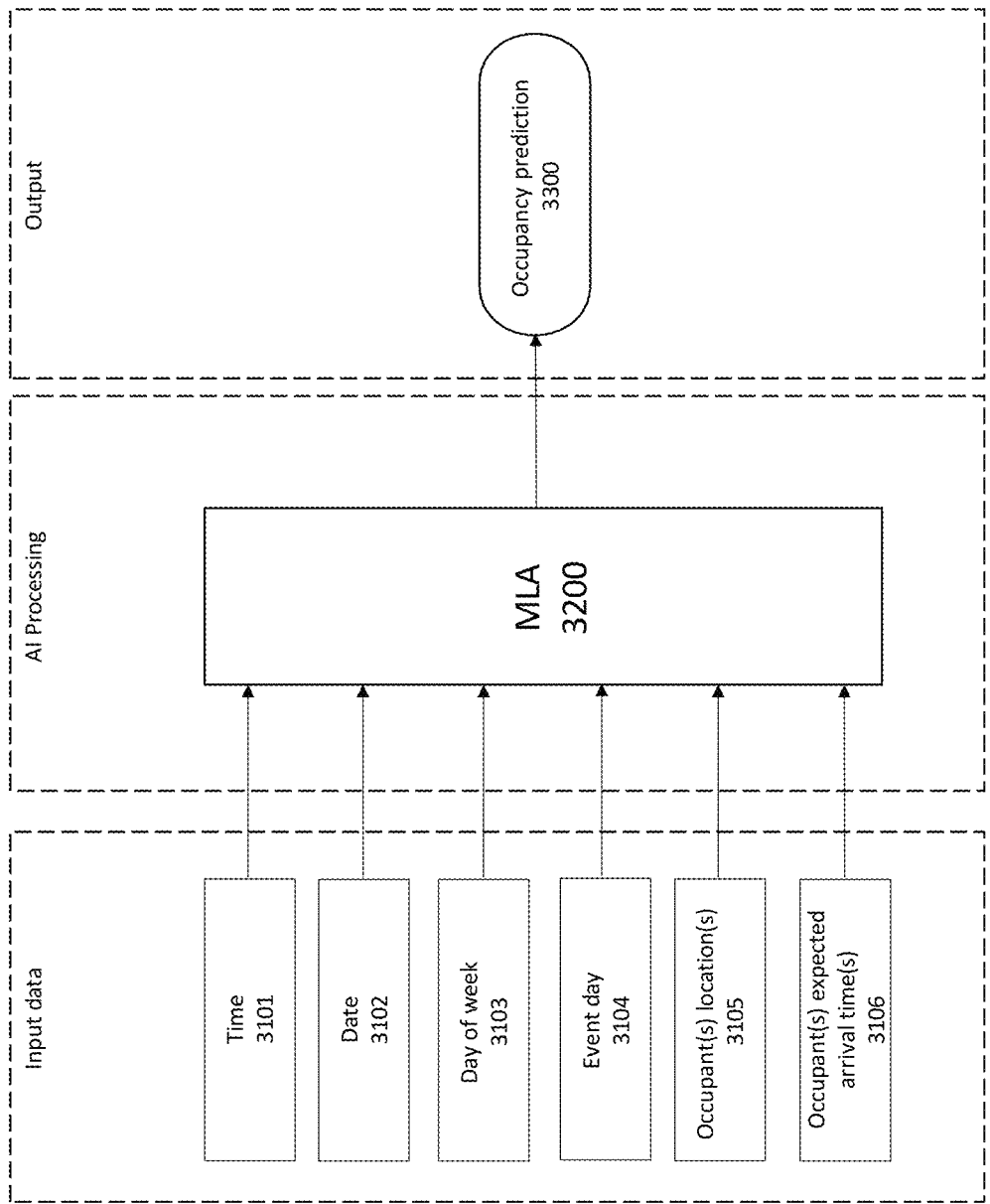
FIG. 3 schematically shows exemplary data processing by an MLA to output an occupancy prediction.

FIG. 3 schematically shows an embodiment of an MLA 3200 executing on a control module (e.g. control module 110) processing a set of input data to output an occupancy prediction e.g. for a house. The MLA 3200 may be the same MLA as the MLA 2200 or it may be a different MLA. The MLA 3200 may be trained using an appropriate training data set, for example based on occupancy level and occupant(s) scheduling of arrival to the house over the course of a year.

The MLA 3200 receives input data specific to the house and its occupants, through the control module, from a plurality of sources, including one or more sensors disposed around the house, one or more user interfaces (e.g. control panels around the house in communication with the control module, smart devices, personal computers, etc.), one or more software program, one or more public and private databases, etc. In the present embodiment, the MLA 3200 receives inputs of the current time 3101, date 3102 and day of the week 3103 e.g. from a clock and calendar function running on the control module or remotely over a communication network. The MLA 3200 further receives inputs of any special events or public holidays 3104 e.g. from the occupants of the house through a user interface, obtained automatically from a calendar app on the occupants' smart device, or obtained from a public domain over the communication network. The MLA 3200 then determines the expected occupancy level based on the input data and outputs an occupancy prediction 3300. By determining the expected occupancy of the building, it is possible to estimate or predict the likely utility (e.g. energy and water) demand.

In a further embodiment, the MLA 3200 receives an input of the current locations 3105 of one or more occupants when the occupants are determined not to be in the house. For example, the occupants may register one or more smart devices (e.g. smartphones) with GPS capability with the control module or a server in communication with the control module, then the MLA 3200 may receive the current location of each occupant by obtaining a GPS signal received on a registered smart device corresponding to each occupant over a communication network. Then, based on the occupants' current locations 3105 and optionally other information such as traffic conditions obtained from the public domain, the MLA 3200 determines an expected arrival time 3106 at the house for each occupant. The expected arrival time 3106 of each occupant may also be determined based on other inputs such as current time 3101, date 3102, day of the week 3103 and event day 3104. The MLA 3200 can then use the expected arrival time 3106 to output an occupancy prediction 3300 (occupancy level in the future rather than current occupancy level) for the house.

The occupancy prediction 3300 is a useful indicator for the control module when performing various control functions for the water provision system. For example, heated water may be directed to radiators of a central heating system installed in the house before the occupants are expected to arrive. Another example is to activate the heat pump to begin storing thermal energy in the thermal energy storage before the occupants are expected to arrive, and moreover the heat pump may be activated at a time based on the expected arrival time 3106 of the occupants such that the thermal energy storage is "fully-charged" (reached certain degree of liquefaction) before the occupants are expected to arrive.

Pre-Charge Thermal Energy Storage

In conventional approaches, heat extracted from the outside air by a heat pump, and from compression of the refrigerant, is transferred directly from an operating liquid of the heat pump to water (e.g. from the mains), e.g. stored in an insulated storage tank, and the heated water from the storage tank is supplied to various water outlets when needed. One drawback of such conventional approaches is the time required for the heat pump to transfer a sufficient amount of heat from the outside air (or whatever the energy source from which energy is extracted by the heat pump) to the water in the tank for the water to reach the desired temperature. As such, a heat pump water heater is generally installed in conjunction with a conventional electrical resistance water heater that brings the water up to the desired temperature at times when the water has not been heated sufficiently by the heat pump.

According to embodiments of the present technology, thermal energy storage medium in a thermal energy storage 150 is provided for storing heat extracted by the heat pump 140, and the stored heat can be used for heating water when required. In the present embodiment, the thermal energy storage medium may be pre-charged by operating the heat pump to transfer heat into the thermal energy storage before demands for heated water arise. This may be desirable where demands for heated water and/or demands for electricity fluctuate throughout the day, such that, for example, operating the heat pump and/or the electrical resistance water heater when demands for heated water are high may not be cost-effective and may put additional pressure on the energy network at a time of high demands.

Figure 4:
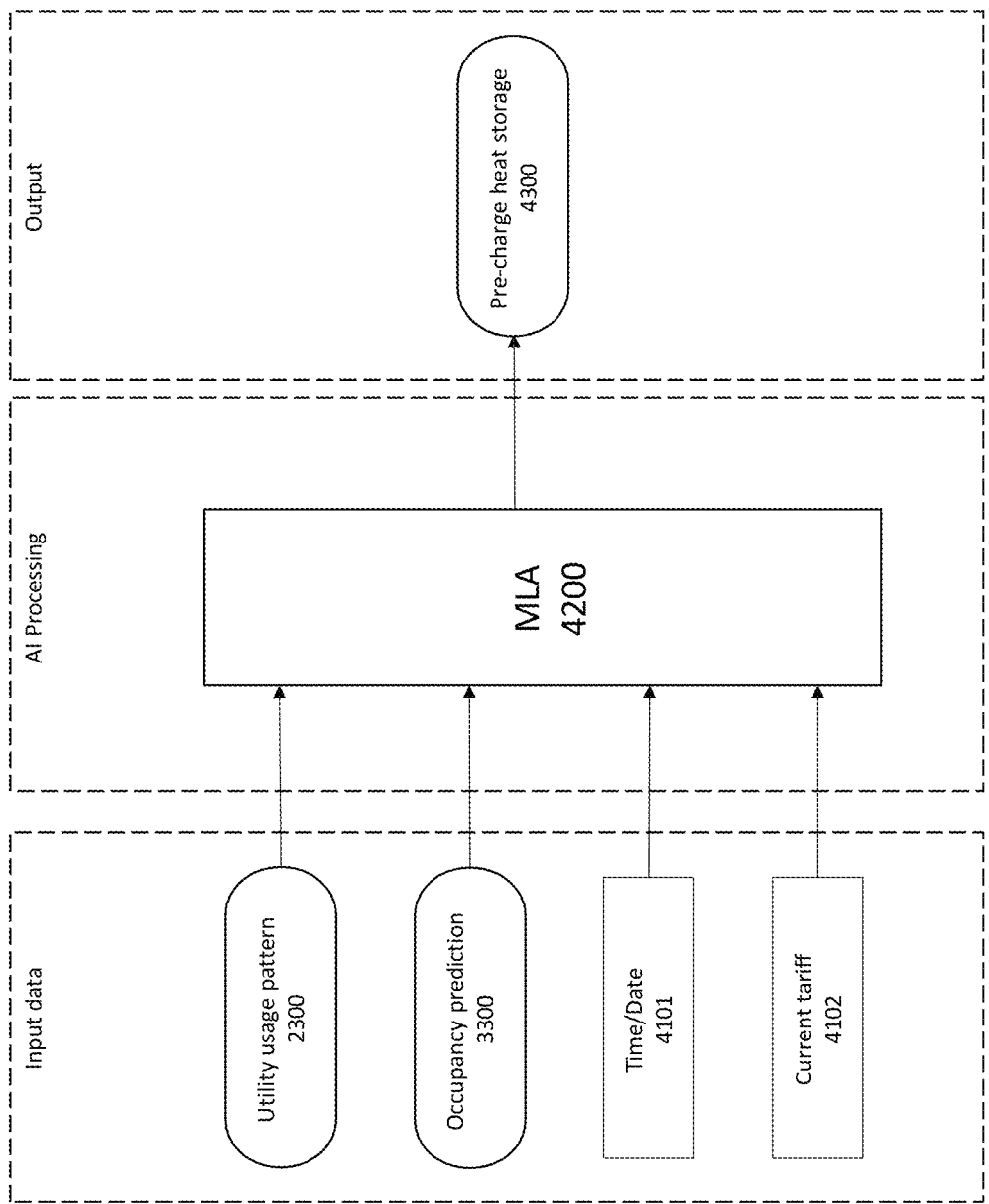
FIG. 4 schematically shows exemplary data processing by an MLA to pre-charge a heat storage.

FIG. 4 schematically shows an embodiment of an MLA 4200 executing on a control module (e.g. control module 110) processing a set of input data to output a decision to pre-charge the thermal energy storage medium to raise its temperature to a desired operation temperature. The MLA 4200 may be the same MLA as the MLA 2200 and/or MLA 3200, or it may be a different MLA. The MLA 4200 may be trained using an appropriate training data set, for example based on heated water demands of the house.

The MLA 4200 receives input data specific to the house and its occupants, through the control module, from a plurality of sources, including one or more sensors disposed around the house, one or more user interfaces (e.g. control panels around the house in communication with the control module, smart devices, personal computers, etc.), one or more software program, one or more public and private databases, etc. In the present embodiment, the MLA 4200 receives an input of a current time and date 4101 e.g. from a clock and/or calendar on the control module, and energy demand data such as a current tariff 4102 which specifies a unit cost of energy e.g. obtained from the energy provider that supplies energy to the house. during off-peak period when the unit cost of energy is lower Alternatively or additionally, the MLA 4200 can derive energy demand data from the utility usage pattern 2300 established as described above and an occupancy prediction 3300. For example, if the current energy usage of the house is lower than an average level over the period of e.g. a day, then the current energy usage may be considered low; in contrast, if the current energy usage of the house is higher than average, then the current energy usage may be considered high.

Then, based on the received tariff information 4102 obtained from the energy provider (and any other energy demand data), the MLA 4200 can determine the current level of energy demand and activates the heat pump to pre-charge the thermal energy storage 4300 when the current energy demand is deemed to be low, in preparation for provision of heated water before demands for heated water arise e.g. when the occupants are expected to arrive at the house and/or when demands for heated water is expected to rise in the evening.

Moreover, using the received time/date 4101 together with the utility usage pattern 2300 and an occupancy prediction 3300, the MLA 4200 can predict one or more parameters such as an expected level of heated water usage and an expected level of energy usage. Then, based on the predicted parameters, the MLA 4200 can determine an amount of thermal energy to be stored in the thermal energy storage medium. For example, if the expected level of heated water usage is expected to be high and remain high for a long period of time, the MLA 4200 may operate the heat pump for a period of time sufficiently long before the expected rise of demand in order to pre-charge the thermal energy storage medium to a temperature higher than the normal operating temperature set e.g. by an occupant of the installer in order to store a sufficient amount of energy for sustained heated water usage.

By enabling the water provision system to anticipate expected demands for heated water in order to prepare a storage heat source in advance of a rise in demands, the present embodiment enables a heat pump to be utilised when it may otherwise not be sufficiently responsive if it is only activated at the time of demand. Moreover, by using the current tariff as an input, it is possible to operate the heat pump to pre-charge the thermal energy storage during a low-energy-demand period when the unit cost of energy is lower and relieve the pressure on the energy network by shifting energy usage from a high-demand time to a low-demand time. The present embodiment is equally applicable to a self-sustaining home, in that demands for heated water and electricity often rise and fall in parallel throughout the day. Thus, shifting electricity usage for operating the heat pump to a time of low-electricity demand enables a self-sustaining home to run more smoothly. Overall, the present embodiment enables the use of a more efficient form of providing heated water, i.e. a heat pump, at a lower cost and with little drawback as a result of delays in heating water up to the desired temperature.

Hot Water Demand Prediction

Figure 5:
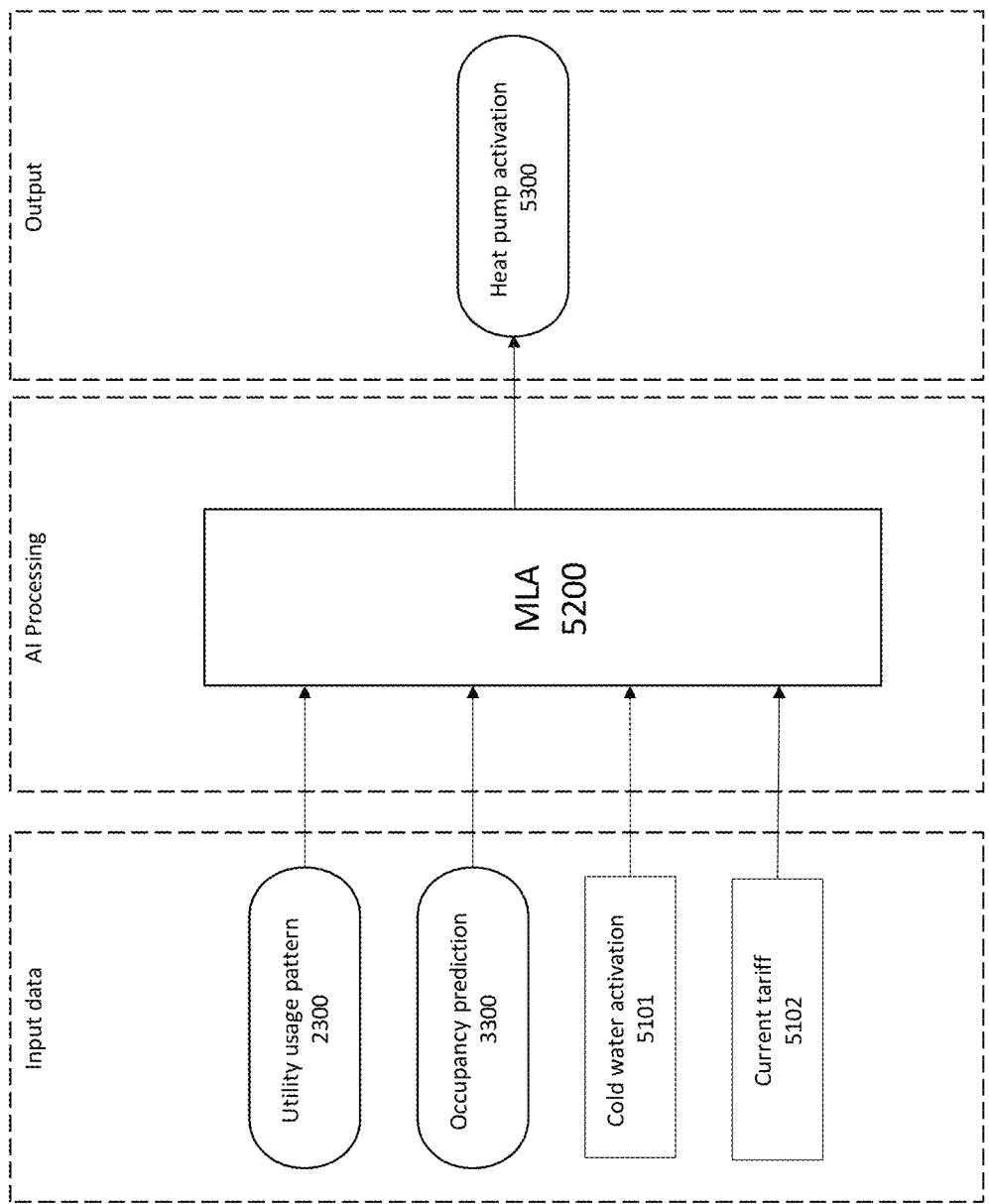
FIG. 5 schematically shows exemplary data processing by an MLA to activate a heat pump.

FIG. 5 schematically shows an embodiment of an MLA 5200 executing on a control module (e.g. the control module 110) trained to determine whether to activate the heat pump based on cold water usage. The MLA 5200 may be the same MLA as the MLA 2200 and/or MLA 3200 and/or MLA 4200, or it may be a different MLA.

The MLA 5200 receives input data specific to the house, through the control module, from a plurality of inputs, including one or more sensors disposed around the house, one or more user interfaces (e.g. control panels around the house in communication with the control module, smart devices, personal computers, etc.), one or more software program, one or more public and private databases, etc. During a training phase, the MLA 5200 can be trained to recognise a correlation between heated water usage that follows from cold water usage. For example, the MLA 5200 can be trained to recognise a correlation between the use of cold water in a bathroom (e.g. to fill the water tank of a toilet) followed by a demand for heated water from a tap in the bathroom (e.g. for handwashing). Thus, during the training phase, the MLA 5200 may use sensor data relating to heated water usage that follows from cold water usage to establish a degree of correlation between the two events. The sensor data may for example include an elapse time between receiving the first sensor data and receiving the second sensor data, a location of the second water outlet in relation to the first water outlet, a frequency of receiving the second sensor data subsequent to receiving the first sensor data, a time of the day, a day of the week, but the list is not exhaustive.

In the present embodiment, the MLA 5200 receives inputs of a cold-water outlet being activated 5101, and based on the current cold water usage in relation to the established utility usage pattern 2300 and an occupancy prediction 3300, the MLA 5200 can determine the probability of a demand for heated water that may follow from the current cold water usage according to the degree of correlation for the current cold water usage. If an expected demand for heated water is determined, the MLA 5200 can instruct the control module to activate the heat pump 5300 in anticipation for the demand.

In order to determine whether the probability of a demand for heated water that may follow from the current cold water usage is sufficiently high to merit expending energy to operate the heat pump to pre-charge the thermal energy storage medium, the MLA 5200 may establish a threshold during the training phase that indicates when the probability merits an activation of the heat pump. In an embodiment, the threshold may be established manually by an occupant or an installer manually inputting instances when such a predictive activation of the heat pump is desirable. In another embodiment, the threshold may be established by the MLA 5200 based on the utility usage pattern 2300 and/or an occupancy prediction 3300.

In a further embodiment, the determination by the MLA 5200 of whether to activate the heat pump may moreover be based on an input of the current tariff 5102 e.g. obtained from the energy provider. In the present embodiment, the threshold may be determined based on tariff information obtained from the energy provider during the training phase. Alternative or in addition, the threshold may be revised during run time based on the current tariff. For example, if the current tariff 5102 indicates an off-peak tariff, meaning that the electrical heating elements 160 can be operated at low cost, and the MLA 5200 determines a low correlation between the current cold water usage and an expected demand for heated water, the MLA 5200 may determine that it is not necessary to activate the heat pump to pre-charge the thermal energy storage since there is unlikely to be a demand for heated water; should there be a demand for heated water, the electrical heating elements 160 can be used to heat water. On the other hand, if the current tariff 5102 indicates a peak tariff when the unit cost of energy is high, meaning that heating water using the electrical heating elements 160 will be costly, and if the MLA 5200 determines that there is only a low correlation between the current cold water usage and an expected demand for heated water, the MLA 5200 may determine that it is more cost-effective to activate the heat pump to pre-charge the thermal energy storage in preparation for a demand for heated water despite the low correlation, so as to avoid the more costly option of using the electrical heating elements 160 to provide heated water. In the latter example, the MLA 5200 may revise the threshold so that it is lower than the threshold in the former example, such that the heat pump may be activated in the latter example even if the probabilities in both cases are the same.

By preparing the water provision system before heated water is needed, it is possible to reduce delays in heated water provision, thereby reducing clean water wastage by reducing the time a water outlet is left turned on while the occupant waits for the water to be heated up. Moreover, by anticipating an expected demand for heated water and predictively preparing a storage heat source by operating the heat pump before heated water is required, it is possible to utilise a heat pump as a reliable form of heated water provision with reduced or even without inherent delays.

Predictive Defrosting

As explained above, a heat pump such as the heat pump 140 comprises an outdoor unit with heat exchanger coils that extract heat from the air or ground outside and transfers it to an indoor unit either directly to the inside of a building to warm it or to a thermal energy storage medium to store it for use later. The process of extracting thermal energy from the outside air cools the heat exchanger coils in the outdoor unit, and moisture from the air condenses on the cool outdoor coils. In cold outdoor conditions, for example when the outside air is 5° C., the outdoor coils can cool below freezing, and frost can form on the outdoor coils. As frost accumulates on the outdoor coils, the heat pump becomes less efficient, requiring a greater temperature difference with the outside air to output the same power compared to frost-free coils. It is therefore desirable to operate a heat pump in a defrost cycle, regularly and when frost accumulates, to remove frost from the heat exchanger coils in the outdoor unit of the heat pump.

A number of factors can influence when a heat pump requires a defrost cycle, for example outdoor temperature and humidity, the power output of the heat pump, and the condition of the heat pump (e.g. older system may be less efficient and requires more frequent defrosting). Generally, a heat pump operates a defrost cycle whenever frost forms on the outdoor heat exchanger coils.

During a defrost cycle, a heat pump is operated in reverse, in that warm refrigerant is sent to the outdoor unit to thaw the heat exchanger coil. A heat pump may operate a defrost cycle until, for example, the coil reaches around 15° C. Once the heat exchanger coil is thawed, the heat pump can resume the normal heating cycle. Clearly, while a heat pump is operating a defrost cycle, it will not be able to performs its normal function of transferring heat to the indoor unit (e.g. into the thermal energy storage 150) until the defrost cycle is complete. It may therefore be desirable to prepare the building before a heat pump defrost cycle begins.

Figure 6:
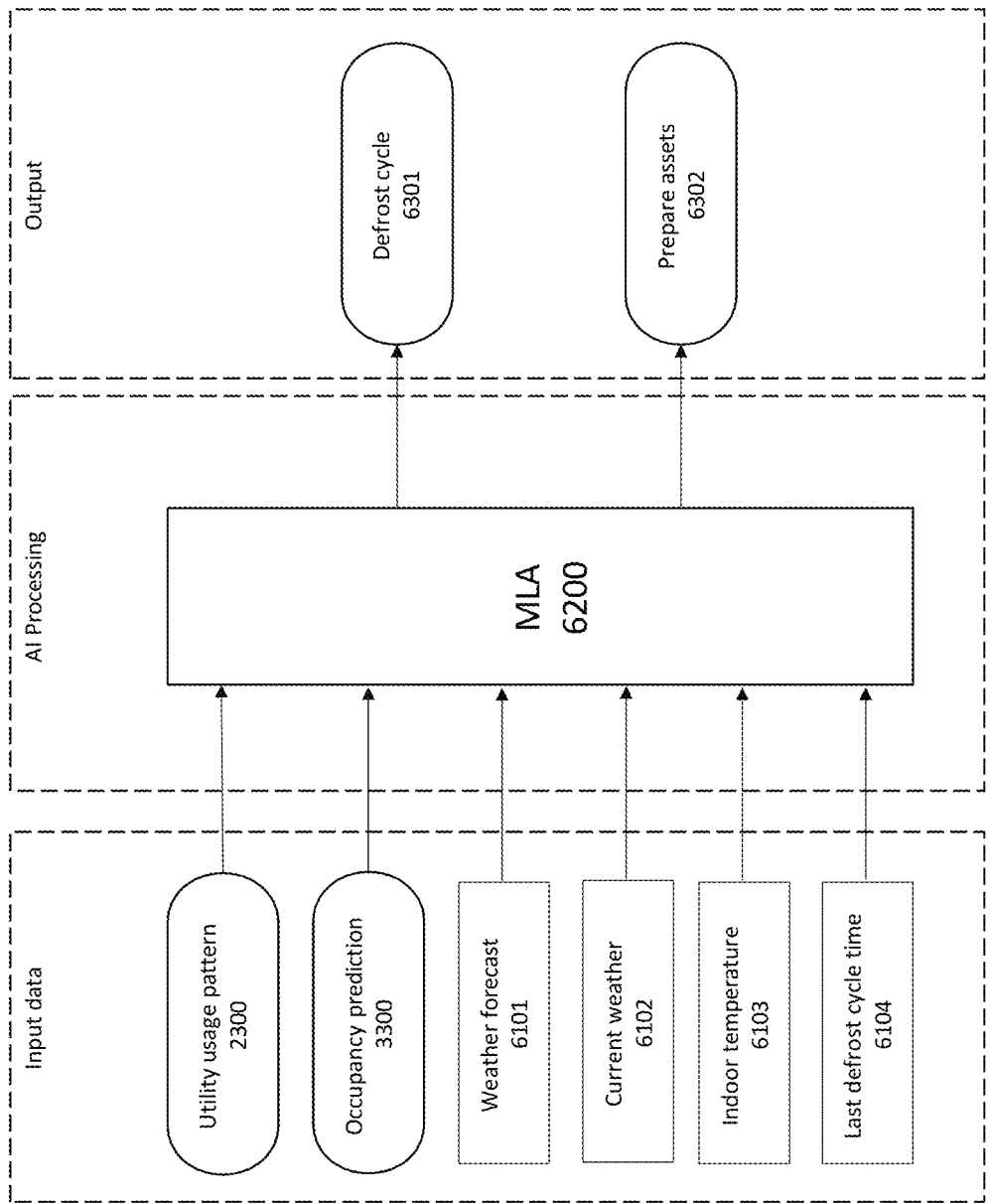
FIG. 6 schematically shows exemplary data processing by an MLA to initiate a heat pump defrost cycle.

FIG. 6 schematically shows an embodiment of an MLA 6200 executing on a control module (e.g. the control module 110) processing a set of input data to predict the next defrost cycle of a heat pump (e.g. the heat pump 140). The MLA 6200 may be the same MLA as the MLA 2200 and/or MLA 3200 and/or MLA 4200 and/or MLA 5200, or it may be a different MLA.

The MLA 6200 receives input data specific to the house, through the control module, from a plurality of inputs, including one or more sensors disposed around the house, one or more user interfaces (e.g. control panels around the house in communication with the control module, smart devices, personal computers, etc.), one or more software program, one or more public and private databases, etc. During a training phase, the MLA 6200 may be trained to recognise when a defrost cycle is required, and establish a timescale and an average energy requirement for operating the heat pump in a defrost cycle, based for example on weather forecasts, current weather conditions, indoor temperatures and data collected from previous defrost cycle(s), with knowledge of the performance of the heat pump (e.g. an average thermal energy output of the heat pump, a heat pump efficiency or coefficient of performance, and any other information or quantities relating to the performance of the heat pump).

In the present embodiment, the MLA 6200 receives inputs of weather forecast 6101 e.g. obtained from the public domain or a weather app on a smart device registered on the control module, current weather condition 6102 such as temperature and humidity e.g. obtained from the public domain or one or more sensors disposed around the house, indoor temperature 6103 e.g. obtained from one or more temperature sensors disposed inside the house, and data relating to the last defrost cycle(s) 6104 when the heat pump was last defrosted. Based on, the MLA 6200 can. Based on the weather forecast, the current weather conditions and the indoor temperature, the MLA 6200 can predict when the next defrost cycle may be expected 6301, e.g. when there is a long period of low temperature and high humidity a defrost cycle may be needed sooner, and may estimate a length of time required to defrost the heat pump. Moreover, using the established utility usage pattern 2300 and an occupancy prediction 3300, the MLA 6200 can estimate an expected energy and heated water demand during the time when a defrost cycle is predicted, and prepares the water provision system in anticipation of the predicted defrost cycle 6302, for example by storing additional thermal energy in the thermal energy storage (by storing energy as sensible heat in addition to latent heat in the PCM), heating the house to a temperature higher than the pre-set temperature, etc.

Additionally or alternatively, the MLA 6200 may moreover anticipate when demands for energy and heated water (e.g. for taps, showers and/or central heating) are low, and determine an appropriate timing for defrosting the heat pump that is e.g. less disruptive to the provision of heated water to the occupants. Using the inputs, the MLA 6200 can determine a time period when water and energy demands are low (e.g. overnight) and/or when occupancy is low (e.g. during school and working hours), and adjust the expected start time of the next defrost cycle to the determined low-demand time and/or low-occupancy time. The MLA 6200 may then instruct the control module to operate the heat pump to begin a defrost cycle 6301 at the adjusted start time. For example, if the MLA 6200 predicts a defrost cycle may be needed in the early evening when energy and heated water demands are expected to be high, the MLA 6200 may pre-charge the thermal energy storage medium by operating the heat pump to store more heat, e.g. by raising the temperature of the thermal energy storage medium to a higher operating temperature, as well as diverting some of the heat to warm up the building before the predicted defrost cycle, and/or the MLA 6200 may adjust the defrost cycle start time to later in the evening when demands are expected to be lower. In another example, if a defrost cycle is expected during the day, the MLA 6200 may determine, based on an occupancy prediction and/or the usage pattern, that the next defrost cycle is during a period of time when energy and heated water demands are low e.g. when occupancy is expected to be low or zero, and determine that no preparation or adjustment is required.

By predicting the next defrost cycle for the heat pump and predictively preparing the water provision system before the defrost cycle begins, based e.g. on the performance of the heat pump, weather forecasts, current weather conditions, current indoor temperature, expected occupancy and demands for heated water, the present embodiment allows necessary heat pump defrost cycles to be performed in a manner that is less disruptive to the provision of heated water and thereby enables a heat pump to be utilised as an effective way of providing heated water.

Cold Water Suggestion

In an embodiment, methods and systems are provided to monitor and interactively modify water usage habits of the occupants. The methods may be implemented by an MLA 7200. The MLA 7200 may be the same MLA as the MLA 2200 and/or MLA 3200 and/or MLA 4200 and/or MLA 5200 and/or MLA 6200, or it may be a different MLA. During a training phase, the MLA 7200 is provided with data relating to water usage e.g. by occupants of the house to establish a normal water usage pattern, as described above. In addition, the MLA 7200 may be trained to recognize or identify instances in the normal usage pattern when a water outlet is turned on for provision of heated water at a temperature T1 set by an occupant, but the water outlet is subsequently turned off before the water is heated to T1. This is particularly relevant when a heat pump is used to provide heated water, since there may be instances when, upon activating the heat pump, energy extracted by the heat pump must first heat a thermal energy storage medium up to a desired operating temperature before water can be heated sufficiently by the thermal energy storage medium. In cases where the heat pump is activated in response to a demand for heated water, but the water outlet is turned off before water is heated to the desired temperature, the energy (electricity) used to operate the heat pump is wasted since the occupant did not in fact receive heated water. In view of the foregoing, the MLA 7200 may be trained to employ one or more energy-reduction strategies when one such short-duration instances is determined.

Figure 7:
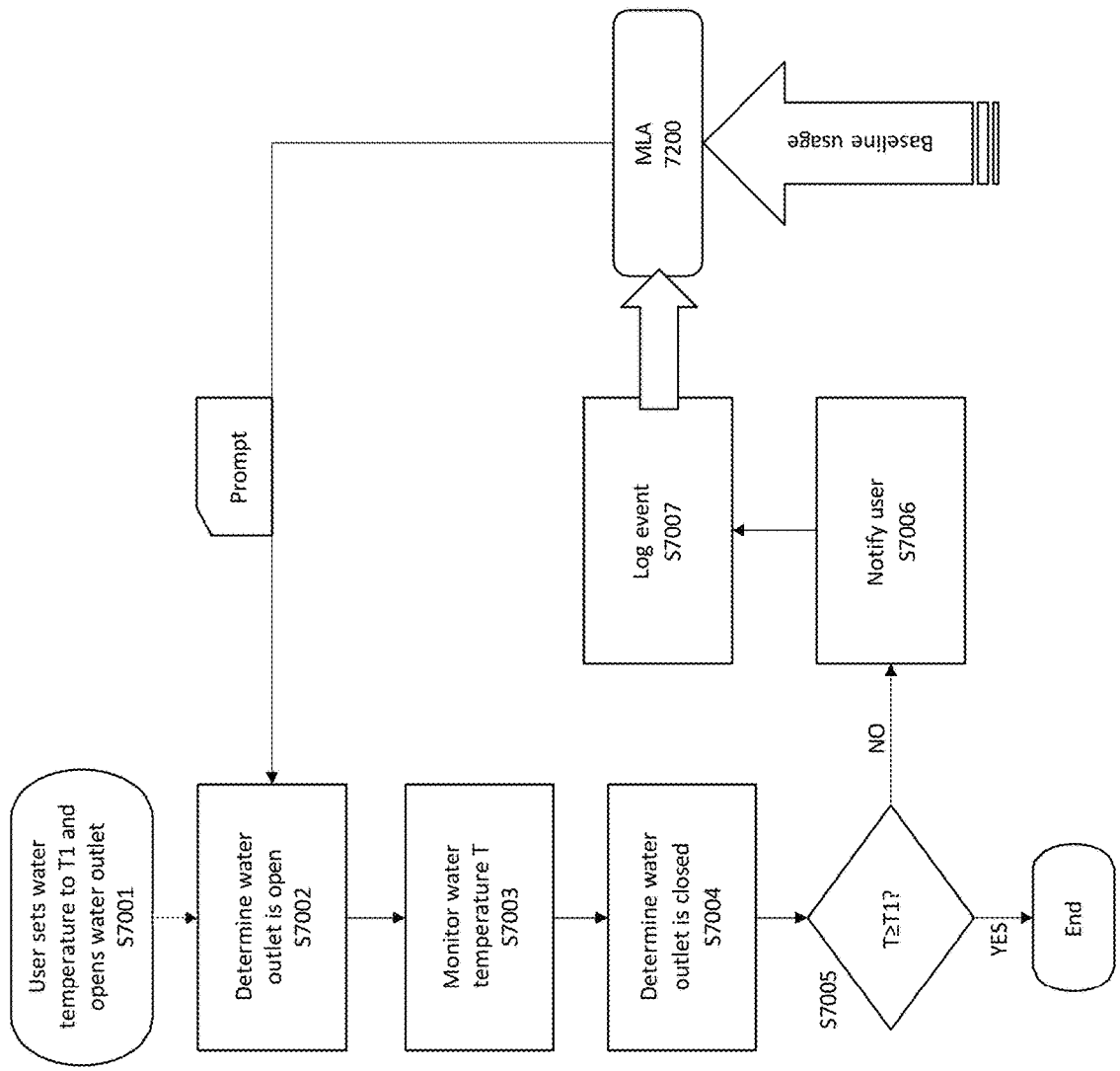
FIG. 7 is a flow diagram of an exemplary method of modifying water usage habit of a user according to an embodiment.

Referring to FIG. 7, at S7001, an occupant sets the water temperature at a water outlet to T1 and opens the water outlet. At S7002, the control module determines that the water outlet is turned on, e.g. by detecting, using one or more sensors, a change in water pressure or water flow at a water source supplying to the water provision system, and the control module at S7003 runs the MLA 7200 to monitor changes in the water temperature at the water outlet. Subsequently, the control module at S7004 determines that the water outlet is turned off, and the MLA 7200 at S7005 determines whether, during the time period when the water outlet is turned on, the water temperature has reached T1 set by the user. If so, the method ends with no further action.

If it is determined at S7005 that the water temperature has not reached T1 during the time period when the water outlet is turned on, the MLA 7200 may employ one or more energy-reduction strategies. In an embodiment, the MLA 7200 initiates a software function to generate a notification to notify the occupant, at S7006, that the water has not reached the pre-set temperature before the water outlet was turned off. The MLA 7200 may optionally log the event at S7007.

At a subsequent time, an occupant may again set the water temperature at the same water outlet to T1 and turned on the water outlet. Before or upon determining that the water outlet is open, in the present embodiment, the MLA 7200 identifies this water usage instance as a short duration instance in which the water temperature is unlikely to reach T1 before the user turns off the water outlet, and then initiates a software function to generate a prompt signal to prompt the user to set the water temperature at a lower temperature T2 or to use cold water instead of heated water. The prompt signal may for example be flashing light at or near the water outlet, production of a predetermined sound or tone, a verbal and/or visual prompt (e.g. playing a message or an image), etc. The MLA 7200 may determine such short-duration instances based on the established usage pattern, or use one or more indicators to identify such short-duration instances. For example, the MLA 7200 may use the location of the water outlet or the time when heated water is demanded as an indicator. As another example, the MLA 7200 may previously determine a correlation between a cold-water usage instance prior to such short-duration heated water usage instance, such as when a toilet is flushed then refilled, and the subsequent heated water demand for handwashing, and use such cold-water usage as an indicator.

Thus, according to the present embodiment, the occupant is made aware of instances when they demand heated water but have not used the water for a sufficiently long time for the water to be heated to temperature. Moreover, the user is prompted to use lower temperature or cold water instead of heated water at the next instance when it is likely to be of short duration, such that the user has a choice to avoid wasting energy by demanding heated water from the water provision system when it may not be necessary. The present embodiment therefore enables interactive modification of heated water usage habits of occupants to reduce energy usage.

Figure 8:
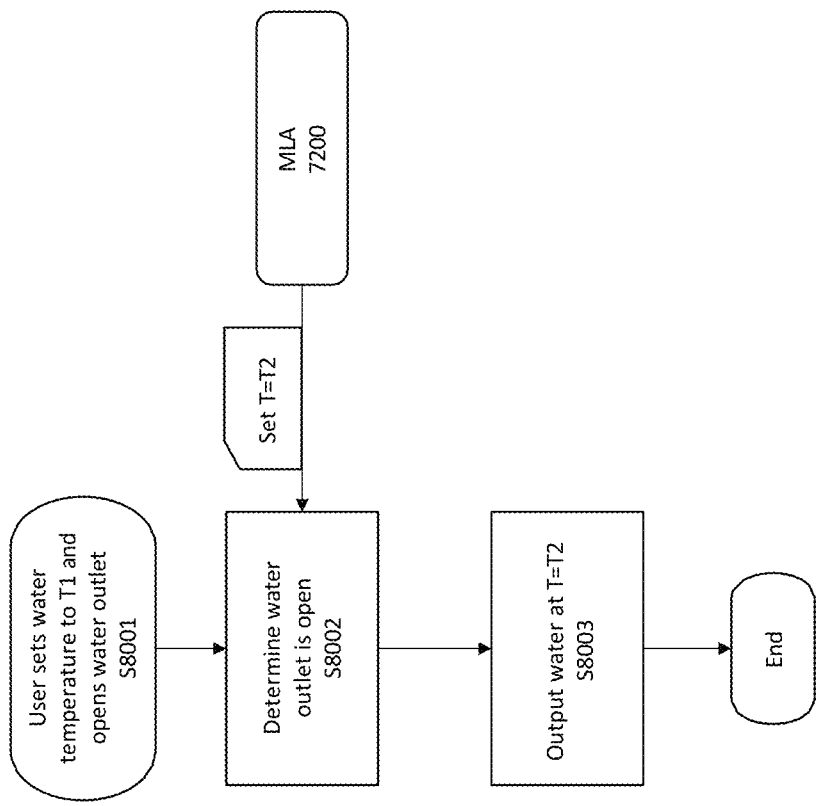
FIG. 8 is a flow diagram of an exemplary method of modulating water usage according to an embodiment.

In another complimentary or alternative embodiment shown in FIG. 8, an occupant again sets the water temperature to T1 at S8001 and turns on the water outlet. Before or upon the control module determining at S8002 that the water outlet is turned on, the MLA 7200 identifies this water usage instance as a short-duration instance and employs an additional or alternative energy-reduction strategy by causing the control module to change the temperature setting of the water outlet from T1 to a lower temperature T2. Temperature T2 may be a lower temperature than T1 but still heated, or T2 may represent unheated cold water from the mains. Under the control of the control module, the water provision system outputs water at the temperature T2 to the water outlet at S8003.

Thus, according to the present embodiment, the control module proactively reduces the water temperature when the MLA 7200 identifies a short duration instance. By reducing the water temperature, less energy is required to heat the water. In doing so, the present embodiment reduces energy consumption when heated water is not necessary.

Figure 9:
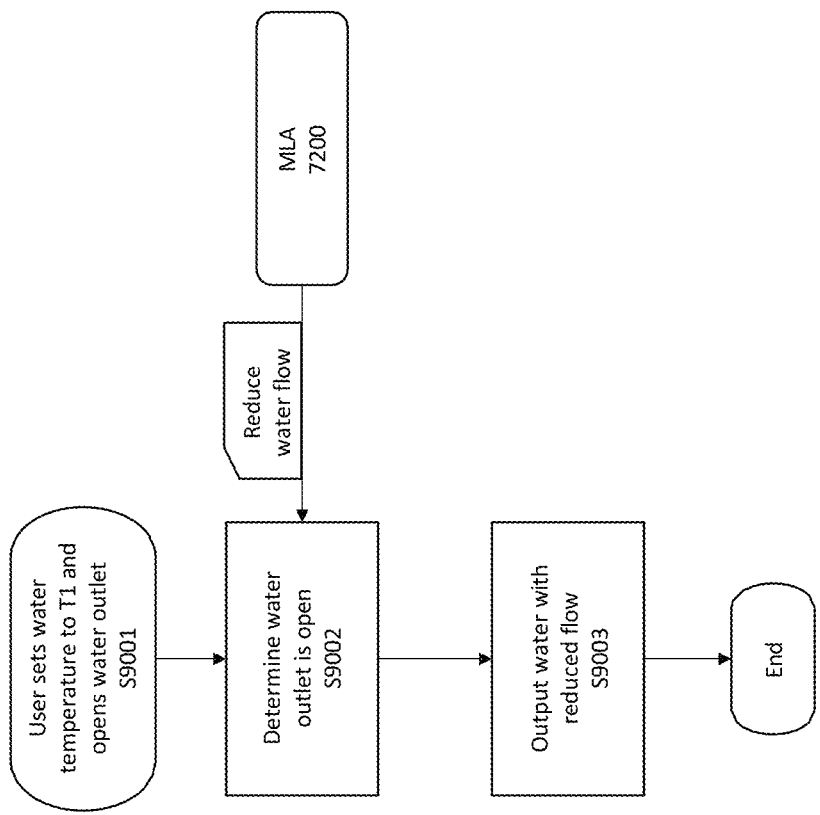
FIG. 9 is a flow diagram of another exemplary method of modulating water usage according to an embodiment.

In yet another complimentary or alternative embodiment shown in FIG. 9, an occupant again sets the water temperature to T1 at S9001 and turns on the water outlet. Before or upon the control module determining at S9002 that the water outlet is turned on, the MLA 7200 identifies this water usage instance as a short-duration instance and employs an additional or alternative energy-reduction strategy by causing the control module to adjust the flow rate of the water outlet to a lower flow rate. Under the control of the control module, the water provision system outputs water at the lower flow rate to the water outlet at S9003.

Thus, according to the present embodiment, the control module proactively reduces the water flow when the MLA identifies a short duration instance. This embodiment is particularly relevant when water is heated e.g. by electric heating elements, such that, by reducing water flow, less water is required to be heated and less energy is required to heat the amount of water being used. In doing so, the present embodiment reduces both water and energy consumption.

Leakage Warning

Figure 10:
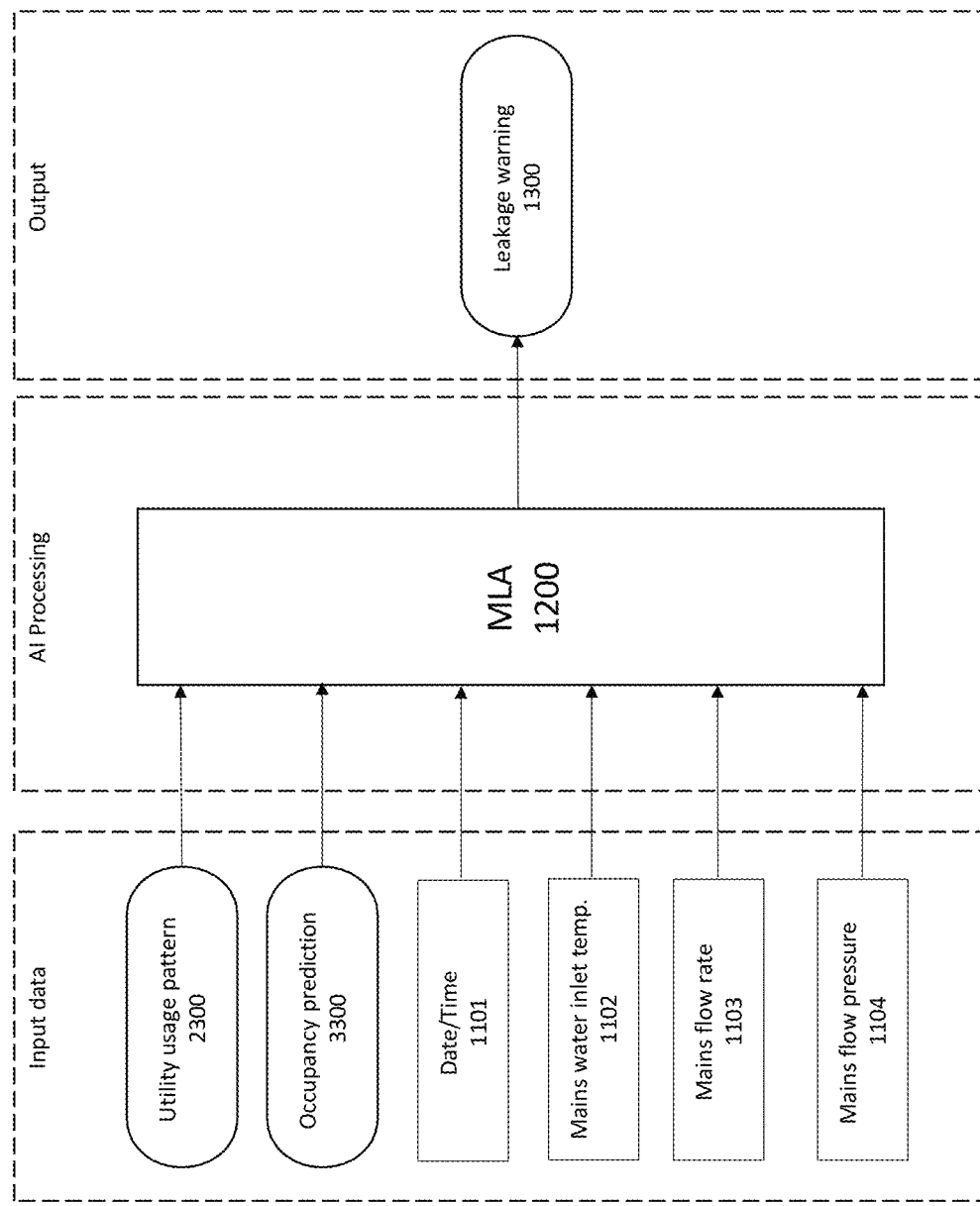
FIG. 10 schematically shows exemplary data processing by an MLA to output a leakage warning.

FIG. 10 schematically shows an embodiment of an MLA 1200 executing on a control module (e.g. the control module 110) processing a set of sensor data to output a leakage warning for a given building. The MLA 1200 may be the same MLA as the MLA 2200 and/or MLA 3200 and/or MLA 4200 and/or MLA 5200 and/or MLA 6200 and/or MLA 7200, or it may be a different MLA.

The MLA 1200 receives input data specific to the house, through the control module, from a plurality of inputs, including one or more sensors disposed around the house, one or more user interfaces (e.g. control panels around the house in communication with the control module, smart devices, personal computers, etc.), one or more software program, one or more public and private databases, etc. In the present embodiment, the MLA 1200 receives the current time and date 1101 e.g. from a clock and calendar function running on the control module or remotely over a communication network, then using the established utility usage pattern 2300 and an occupancy prediction 3300, the MLA 1200 can estimate an expected water usage for the current time and date. In addition, the MLA 1200 receives inputs of the mains water inlet temperature 1102, flow rate of the mains water 1103 and water pressure of the mains water 1104 e.g. measured by appropriate sensor(s) at the mains water inlet to the house, and determines a real-time water usage. The MLA 1200 can then determine, based on the expected usage and real-time usage, whether the current water usage is as expected or not, and if the current water usage exceeds the expected usage the MLA 1200 outputs a water leakage warning 1300. The MLA 1200 can be previously trained to recognise whether instances when the current water usage exceeds the expected usage correlate to a water leakage in the system or to an unexpected increase in demand, for example a change in the weather or an increase in occupancy. In some embodiments, the MLA 1200 may be provided with a threshold above which the level of water usage exceeding the expected usage is deemed a leak. The MLA 1200 may alternatively establish such a threshold during a training phase, or adjust the threshold while in use e.g. based on user feedback.

By establishing a utility usage pattern and monitoring current water usage against the pattern, it is possible to detect a potential water leakage in the system and give early warning to the occupants to take remedial or corrective measures before the leakage becomes more serious.

The various MLAs described above may refer to the same or different MLA. If multiple MLAs are implemented, one or some or all of the MLAs may be executed on the control module 110, and one or some or all of the MLAs may be executed on a server (e.g. a cloud server) in communication with the control module 110 via a suitable communication channel. It will be understood by those skilled in the art that the embodiments above may be implemented in any combinations, in parallel or as alternative strategies as desired.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A computer-implemented method of predictively preparing a water provision system installed in a building, the water provision system comprising, a heat pump configured to transfer thermal energy from the surroundings to a thermal energy storage medium to store the thermal energy; and a control module configured to control operation of the heat pump, wherein the water provision system is configured to heat water using the stored thermal energy in the thermal energy storage medium and then supply the heated water to an occupant of the building at one or more water outlets, the method being performed by the control module and comprising:

receiving a current location of the occupant;
estimating an expected arrival time for the occupant to arrive at the building based on the current location of the occupant;
determining an expected occupancy of the building based on the estimated expected arrival time;
determining whether to pre-charge the thermal energy storage medium to raise a temperature thereof to a desired operating temperature based on a rise in expected occupancy of the building; and
activating the heat pump to begin storing thermal energy in the thermal energy storage medium for a predetermined length of time before the expected arrival time of the occupant to the pre-charge of the thermal energy in the thermal energy storage medium to the desired operating temperature, wherein the predetermined length of time is set based on the expected occupancy of the building, and wherein the predetermined length of time is set to be longer for a higher expected occupancy of the building.

2. The method of claim 1, wherein the method is at least partially performed by a machine learning algorithm executing on the control module, wherein the machine learning algorithm is trained to predict an occupancy of the building based on a current location of the occupant.

3. The method of claim 1, wherein receiving a current location of the occupant comprises communicating with an electronic device previously registered on the control module, and wherein the electronic device is at least one selected from the group consisting of: a smartphone, a tablet computer, and a satellite navigation system.

4. The method of claim 3, wherein estimating the expected arrival time of the occupant comprises obtaining the expected arrival time of the occupant from the electronic device.

5. The method of claim 1, wherein the expected arrival time is estimated based on current traffic conditions at the current location of the occupant.

6. The method of claim 1, wherein the predetermined length of time is set based on an expected heated water usage estimated using a utility usage pattern output by a machine learning algorithm that is trained using sensor data obtained from the water provision system.

7. The method of claim 6, wherein the utility usage pattern comprises an expected cold water usage in respect of time, day and/or date, the expected heated water usage in respect of time, day and/or date, an expected energy usage in respect of time, day and/or date, or a combination thereof.

8. The method of claim 1, further comprising diverting a portion of the thermal energy extracted by the heat pump to heat the building from a current indoor temperature to a first indoor temperature, wherein the predetermined length of time is set based on the current indoor temperature and the first indoor temperature.

9. The method of claim 1, wherein the predetermined length of time is manually set by the occupant.

10. The method of claim 1, wherein the predetermined length of time is set based on a time for the thermal energy storage medium to reach an optimal operating temperature.

11. The method of claim 10, wherein the time for the thermal energy storage medium to reach an optimal operating temperature is estimated based on an average of a plurality of previous times for the thermal energy storage medium to reach an optimal operating temperature.

12. The method of claim 10, wherein the time for the thermal energy storage medium to reach an optimal operating temperature is determined by a machine learning algorithm that is trained to determine the time for the thermal energy storage medium to reach an optimal operating temperature based on sensor data obtained from the water provision system.

13. The method of claim 12, wherein the sensor data comprises an indoor temperature, an outdoor temperature, a time the heat pump was last activated, or a combination thereof.

14. A computer-readable medium comprising machine-readable code, which, when executed by a processor, causes the processor to perform the method of claim 1.

15. A control module configured to control a water provision system, the control module comprising a processor having a machine learning algorithm executing thereon trained to perform the method of claim 1.

16. The control module of claim 15, further comprising a communication interface configured to communicate with an electronic device registered on the control module over a communication channel, wherein the electronic device comprises one or more of a smartphone, a tablet computer, and/or a satellite navigation system.

* * * * *